(12) United States Patent
Kikuchi

(10) Patent No.: US 12,724,521 B2
(45) Date of Patent: Sep. 1, 2026

(54) VIDEO DISPLAY FOR AVOIDING HIDING OF PARTICULAR ELEMENT DISPLAYED ON SCREEN

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 486 days.

(21) Appl. No.: 18/008,538

(22) PCT Filed: Aug. 26, 2022

(86) PCT No.: PCT/JP2022/032226
§ 371 (c)(1),
(2) Date: Dec. 6, 2022

(87) PCT Pub. No.: WO2024/042708
PCT Pub. Date: Feb. 29, 2024

(65) Prior Publication Data
US 2024/0393912 A1 Nov. 28, 2024

(51) Int. Cl.
*G06F 3/048* (2013.01)
*G06F 3/0481* (2022.01)
*G06F 3/0488* (2022.01)

(52) U.S. Cl.
CPC .......... *G06F 3/0481* (2013.01); *G06F 3/0488* (2013.01)

(58) Field of Classification Search
CPC ............................ G06F 3/0481; G06F 3/0488
See application file for complete search history.

(56) References Cited

U.S. PATENT DOCUMENTS 9,237,305 B2 * 1/2016 Guzman .................. H04N 7/15
10,139,981 B2 * 11/2018 Engel ....................... G09G 3/36
10,289,290 B2 * 5/2019 Gil ...................... G06F 3/04845
10,642,462 B2 * 5/2020 Sogo ................... G06F 3/04845
10,863,230 B1 * 12/2020 Pham ................ H04N 21/6547
11,487,398 B1 * 11/2022 Wei .......................... G09G 5/14
11,822,761 B2 * 11/2023 Chang .................. G06F 3/0481
11,907,605 B2 * 2/2024 Chang .................. G06F 3/1454
12,061,832 B2 * 8/2024 Geddes .................. H04N 7/155
12,148,064 B2 * 11/2024 Marinenko ............. G06T 11/00
2002/0069411 A1 * 6/2002 Rainville ........... H04N 5/44504 725/110
2008/0030590 A1 * 2/2008 Ciudad .................. H04N 7/147 348/211.12
2008/0079655 A1 * 4/2008 Fujii ....................... G06T 11/60 345/1.2
2008/0320406 A1 * 12/2008 Fukada ............. H04N 21/4316 715/766

(Continued)

FOREIGN PATENT DOCUMENTS

JP 2022008507 A * 1/2022 ........... G06F 3/0412

*Primary Examiner* — Linh K Pham
(74) *Attorney, Agent, or Firm* — Sughrue Mion, PLLC

(57) ABSTRACT

A display (101) displays a foreground window in which a video is played on a screen and so as to hide a portion of a background window in which content including a user-operable interactive element is provided. A detector (102) detects hiding of the interactive element by the foreground window. When the hiding is detected, a changer (103) changes at least either a position or a size of the foreground window so that a portion or an entirety of a hidden portion of the interactive element is no longer hidden.

9 Claims, 13 Drawing Sheets

(56) References Cited

U.S. PATENT DOCUMENTS

| | | | | |
|---|---|---|---|---|
| 2011/0249073 | A1* | 10/2011 | Cranfill | H04N 23/80 348/14.02 |
| 2011/0249086 | A1* | 10/2011 | Guo | H04N 5/272 348/E7.083 |
| 2012/0092438 | A1* | 4/2012 | Guzman Suarez | H04N 7/15 348/E7.083 |
| 2014/0300569 | A1* | 10/2014 | Matsuki | G09G 3/20 345/173 |
| 2019/0058827 | A1* | 2/2019 | Park | G11B 27/00 |
| 2020/0326839 | A1* | 10/2020 | Walkin | G06F 3/04817 |
| 2023/0280896 | A1* | 9/2023 | Zhou | G06F 3/04845 715/719 |

* cited by examiner

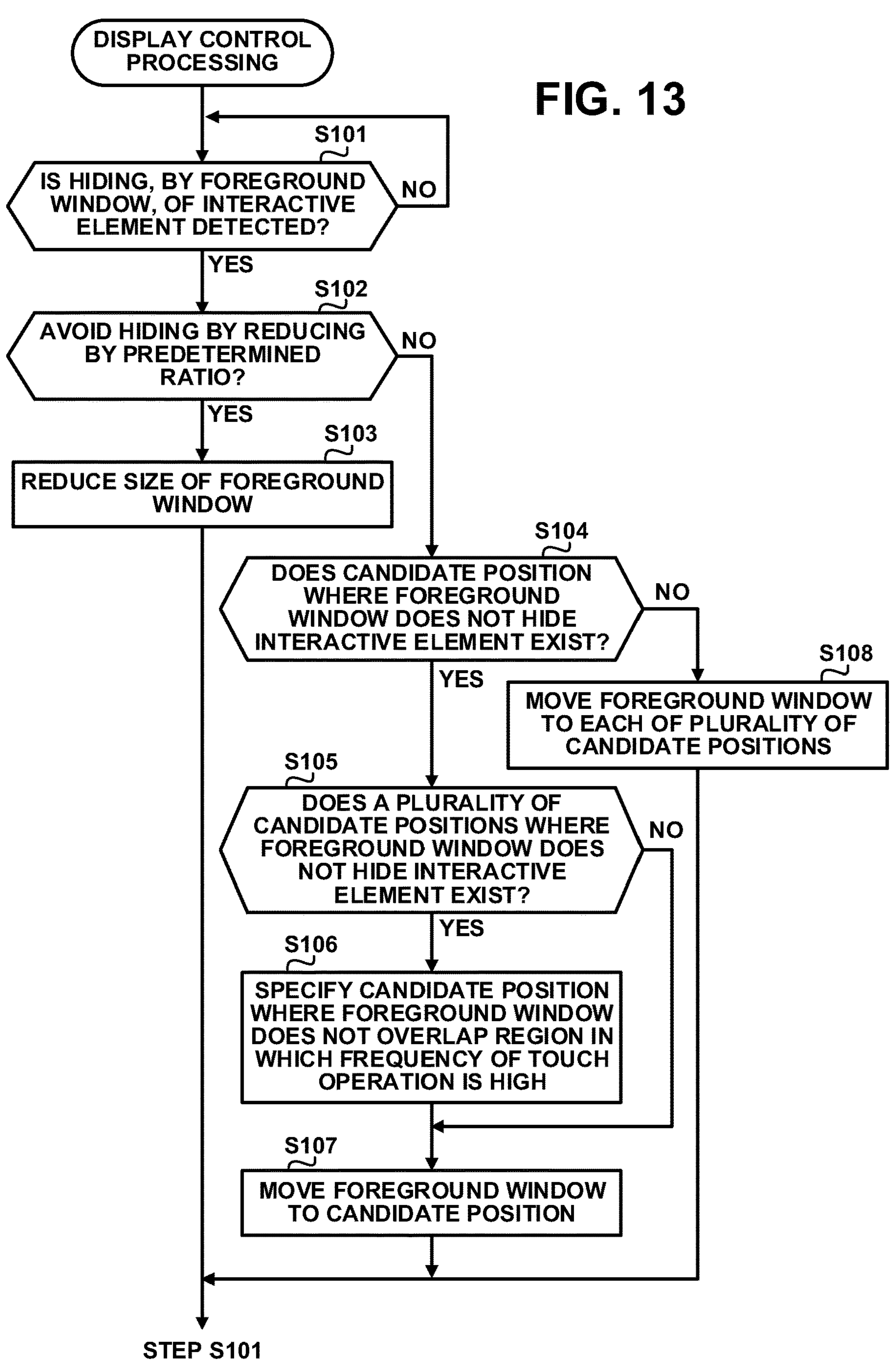
DISPLAY CONTROL PROCESSING
FIG. 13
S101
IS HIDING, BY FOREGROUND WINDOW, OF INTERACTIVE ELEMENT DETECTED?
NO
YES
S102
AVOID HIDING BY REDUCING BY PREDETERMINED RATIO?
NO
YES
S103
REDUCE SIZE OF FOREGROUND WINDOW
S104
DOES CANDIDATE POSITION WHERE FOREGROUND WINDOW DOES NOT HIDE INTERACTIVE ELEMENT EXIST?
NO
YES
S108
MOVE FOREGROUND WINDOW TO EACH OF PLURALITY OF CANDIDATE POSITIONS
S105
DOES A PLURALITY OF CANDIDATE POSITIONS WHERE FOREGROUND WINDOW DOES NOT HIDE INTERACTIVE ELEMENT EXIST?
NO
YES
S106
SPECIFY CANDIDATE POSITION WHERE FOREGROUND WINDOW DOES NOT OVERLAP REGION IN WHICH FREQUENCY OF TOUCH OPERATION IS HIGH
S107
MOVE FOREGROUND WINDOW TO CANDIDATE POSITION
STEP S101

VIDEO DISPLAY FOR AVOIDING HIDING OF PARTICULAR ELEMENT DISPLAYED ON SCREEN

CROSS REFERENCE TO RELATED APPLICATIONS

This application is a National Stage of International Application No. National Stage Entry of PCT/JP2022/032226 filed Aug. 26, 2022.

TECHNICAL FIELD

The present disclosure relates to a video display for avoiding hiding of a particular element displayed on a screen.

BACKGROUND ART

A picture-in-picture function is known in which, in order to perform another task while viewing a video such as, for example, searching for information related to the video, the video having a reduced display region is displayed overlaid on content for the other task.

For example, Patent Literature 1 describes a technology for displaying, by the picture-in-picture function, a video captured by a camera of a terminal device during displaying of a video of a teleconference on the terminal device.

CITATION LIST

Patent Literature

Patent Literature 1: Unexamined Japanese Patent Application Publication No. 2022-008507

SUMMARY OF INVENTION

Technical Problem

The video displayed by the picture-in-picture function described above is displayed overlaid on the content for the other task. Consequently, there is a problem in that, when the content includes a user-operable interactive element, such as a link, for example, and the video is overlaid on the interactive element, the user is unable to operate that interactive element.

The present disclosure is made with the view of the above situation, and an objective of the present disclosure is to provide a technology capable of displaying a video over content while avoiding hiding of a user-operable element included in the content.

Solution to Problem

A terminal device according to a first aspect of the present disclosure includes:

one or more processors, wherein the processors execute processing for

- displaying a foreground window in which a video is played on a screen so as to hide a portion of a background window in which content including a user-operable interactive element is provided,
- detecting hiding of the interactive element by the foreground window, and
- when the hiding is detected, changing at least either a position or a size of the foreground window so that a portion or an entirety of a hidden portion of the interactive element is no longer hidden.

A server device according to a second aspect of the present disclosure includes:

one or more processors, wherein the processors execute processing for

- acquiring, from a terminal device, positions and sizes of a foreground window in which a video is played and a background window in which content including a user-operable interactive element is provided, the foreground window and the background window being displayed on a screen of the terminal device, and a position and a size of the interactive element,
- detecting, based on the acquired positions and sizes, hiding of the interactive element by the foreground window, and
- when the hiding is detected, causing the terminal device to change at least either the position or the size of the foreground window so that a portion or an entirety of a hidden portion of the interactive element is no longer hidden.

A non-transitory computer-readable recording medium according to a third aspect of the present disclosure stores a program for causing a computer to execute processing for

- displaying a foreground window in which a video is played on a screen so as to hide a portion of a background window in which content including a user-operable interactive element is provided,
- detecting hiding of the interactive element by the foreground window, and
- when the hiding is detected, changing at least either a position or a size of the foreground window so that a portion or an entirety of a hidden portion of the interactive element is no longer hidden.

Advantageous Effects of Invention

According to the present disclosure, a video can be displayed over content while avoiding hiding of a user-operable element included in the content.

BRIEF DESCRIPTION OF DRAWINGS

FIG. 13 is a flowchart illustrating display control processing according to the embodiment.

DESCRIPTION OF EMBODIMENTS

1. Overall Configuration

Figure 1:
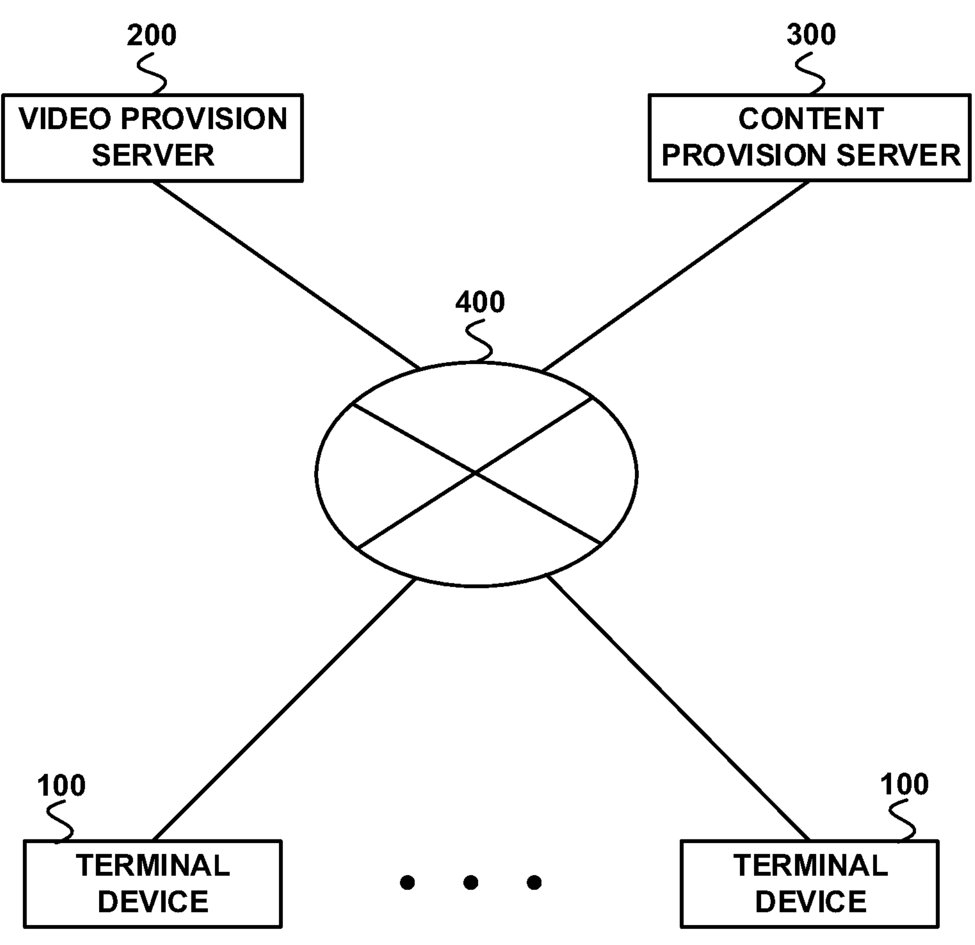
FIG. 1 is a drawing illustrating the relationship between a terminal device, and a video provision server and a content provision server according to an embodiment.

A terminal device according to an embodiment of the present disclosure is a device that displays a video by a picture-in-picture function. As illustrated in FIG. 1, a terminal device 100 is communicably connected to a video provision server 200 and a content provision server 300 across a computer communication network 400 such as the internet.

The terminal device 100 is a device that is used by a viewer for viewing videos. In one example, the viewer connects to the video provision server 200 from the terminal device 100, and views a video provided from the video provision server 200. Additionally, while, for example, viewing the video provided from the video provision server 200, the viewer connects to the content provision server 300 from the terminal device 100 and performs tasks such as viewing and searching content provided from the content provision server 300.

The video provision server 200 is a server that provides a video. The video provision server 200 provides the video to the terminal device 100 in response to a request from the terminal device 100.

The content provision server 300 is a server that provides a variety of content that is screen-displayable on the terminal device 100. The content provision server 300 provides the content to the terminal device 100 in response to a request from the terminal device 100.

In the following, it is assumed that the video provision server 200 provides a video related to live streaming commerce. Live streaming commerce is one mode of electronic commerce. In live streaming commerce, a streamer streams a live video introducing an item, and a viewer viewing that live video can purchase the item. The video provision server 200 receives a video from a streamer terminal (not illustrated) used by the streamer, and distributes the received video in response to a request from the terminal device 100.

The content provision server 300 provides a sales page of the item introduced in the video. The content provision server 300 provides the sales page in response to a request from the terminal device 100.

2. Hardware Configuration of Information Processing Device

Figure 2:
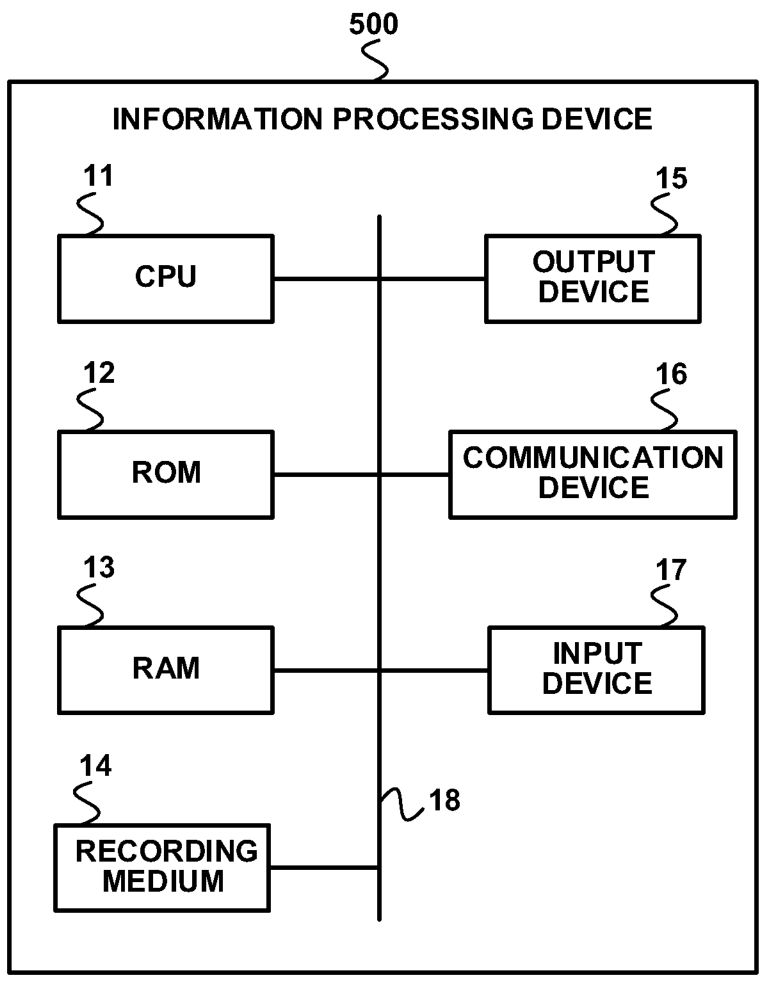
FIG. 2 is a block diagram illustrating the hardware configuration of an information processing device according to the embodiment.

FIG. 2 is a block diagram illustrating the hardware configuration of an information processing device 500 that realizes the terminal device 100, the video provision server 200, and the content provision server 300.

As illustrated in FIG. 2, the information processing device 500 includes a central processing unit (CPU) 11, a read-only memory (ROM) 12, a random access memory (RAM) 13, a recording medium 14, an output device 15, a communication device 16, and an input device 17. The various components are connected by a bus 18.

The CPU 11 controls the operations of the entire information processing device 500, and is connected to and exchanges control signals and data with the various components.

An operating program and various types of data needed for the operation control of the entire information processing device 500 are stored in the ROM 12.

The RAM 13 is a component for temporarily storing data and programs. In addition to the program and the data read out from the recording medium 14, data required for communicating and the like are held in the RAM 13.

The recording medium 14 is configured from a hard disk, a flash memory, or the like, and stores data to be processed by the information processing device 500.

The output device 15 includes a display device such as a liquid crystal display (LCD) or the like, and an audio output device such as a speaker or the like. In one example, under the control of the CPU 11, the output device 15 outputs data output from the CPU 11.

The communication device 16 includes a communication interface for connecting the information processing device 500 to the computer communication network 400 such as the internet or the like, and carries out exchanges with another information processing device or the like via the communication device 16.

The input device 17 includes an input device such as a button, a keyboard, a touch panel, a microphone, a camera, an optical scanner, or the like. The input device 17 receives an operation input from the user of the information processing device 500, and outputs, to the CPU 11, a signal corresponding to the received operation input.

3. Functional Configuration of Terminal of the Embodiment

Figure 3:
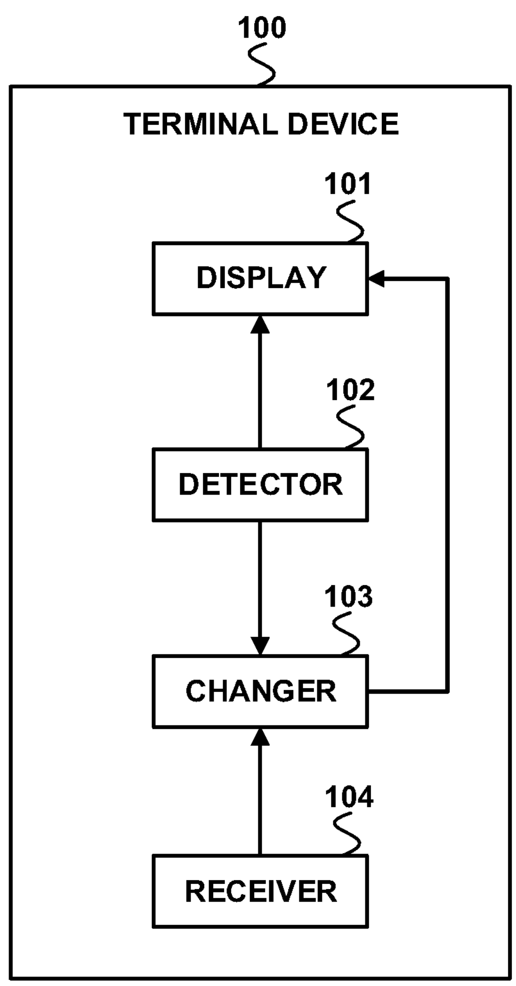
FIG. 3 is a drawing illustrating the functional configuration of the terminal device according to the embodiment.

The functional configuration of the terminal device 100 is described using FIG. 3.

Functionally, the terminal device 100 includes a display 101, a detector 102, a changer 103, and a receiver 104. In the present embodiment, the CPU 11, the output device 15, and the communication device 16 cooperate to function as the display 101, the CPU 11 functions as the detector 102 and the changer 103, and the CPU 11 and the input device 17 cooperate to function as the receiver 104.

The terminal device 100 displays each of a video, related to live streaming commerce, provided by the video provision server 200, and a sales page provided from the content provision server 300. In the following, it is assumed that an application capable of displaying, on a screen, the video related to live streaming commerce and the content is installed on the terminal device 100, and the functions of the display 101, the detector 102, the changer 103, and the receiver 104 are realized by this application.

Figure 4:
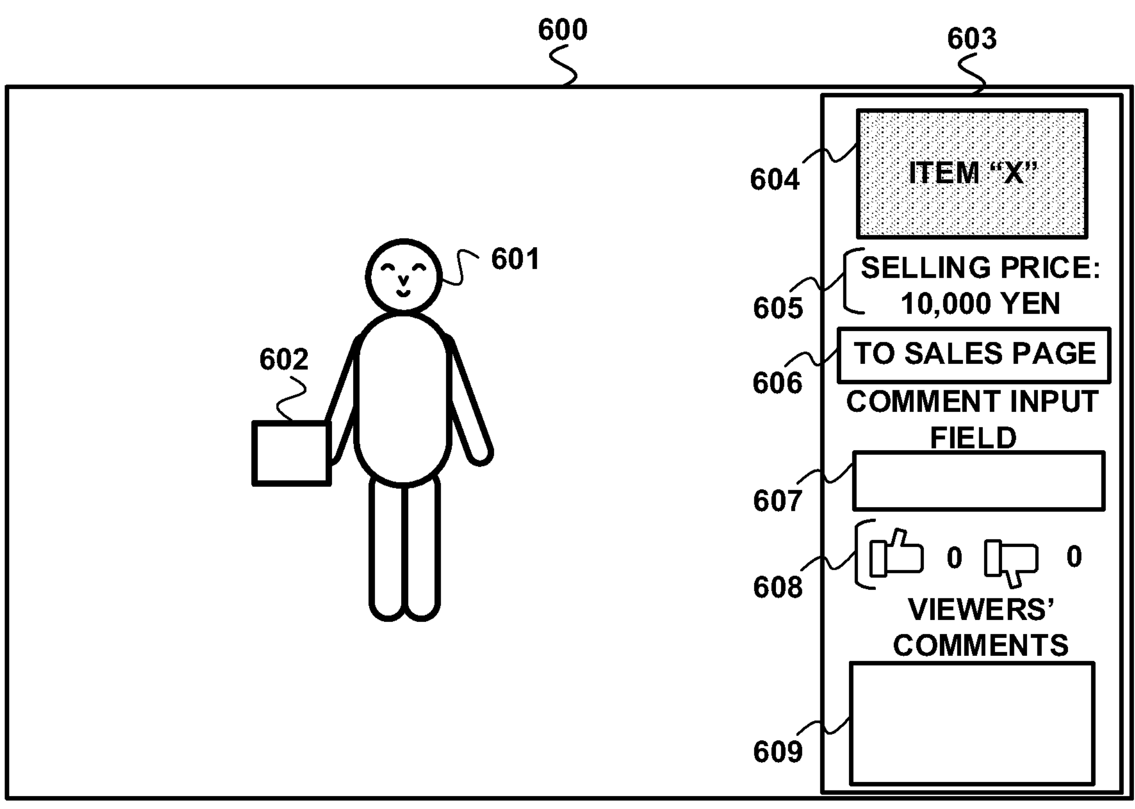
FIG. 4 is a drawing illustrating a video according to the embodiment.

FIG. 4 illustrates an example of the video of the live streaming commerce displayed on the screen of the terminal device 100. A video 600 illustrates a situation in which a streamer 601 is holding and introducing an item "X" 602. Additionally, a panel 603, in which information related to the item "X" is displayed, is displayed in the video 600. The panel 603 includes an image 604 of the item "X", information 605 about a selling price of the item "X", a button 606 for transitioning to a sales page selling the item "X", an input field 607 for the viewer of the video to input a comment, an evaluation icon 608, and a display field 609 for the comment inputted by the viewer of the video.

Figure 5:
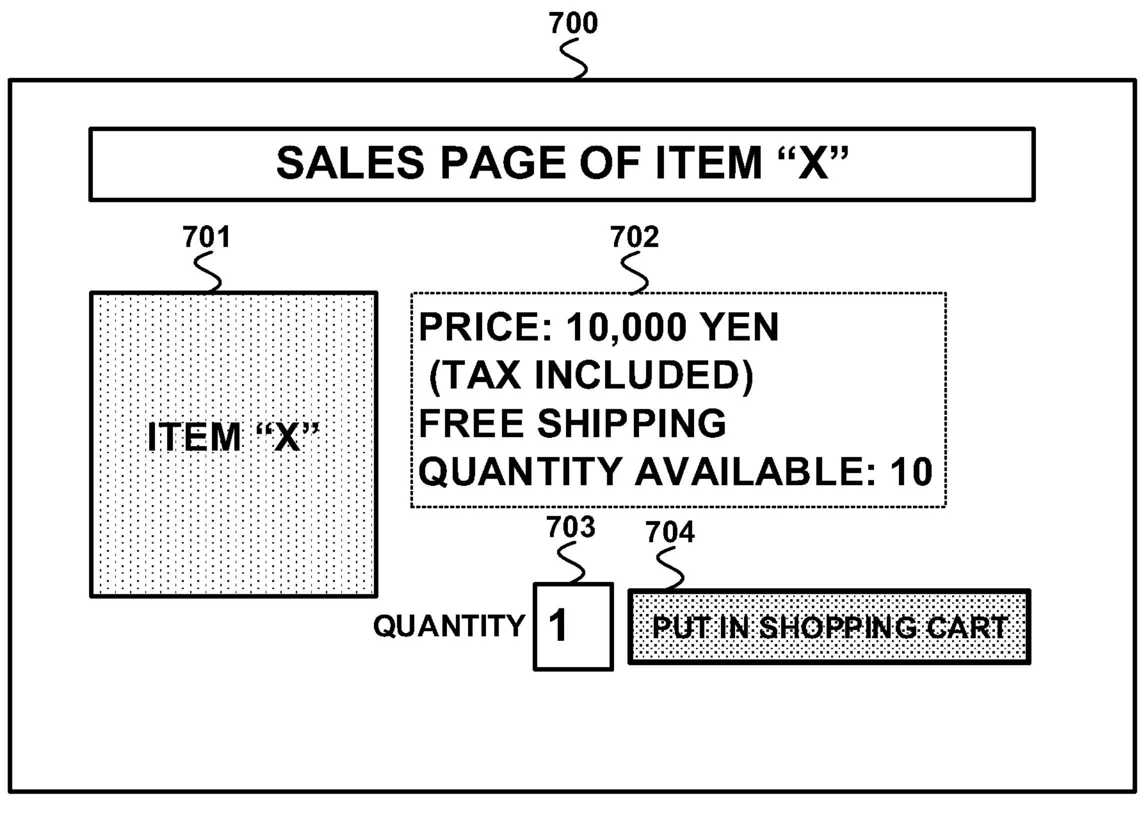
FIG. 5 is a drawing illustrating a sales page according to the embodiment.

FIG. 5 illustrates an example of the sales page displayed on the screen of the terminal device 100. A sales page 700 includes an image 701 of the item "X", information 702 such as a price, a shipping cost, and the like of the item "X", a box 703 for inputting a quantity of the item "X" to be placed in a shopping cart, and a button 704 for placing the item "X" in the shopping cart. The sales page 700 of FIG. 5 is displayed upon selection of the button 606 in the video 600 of FIG. 4.

In the following, the functions of the terminal device 100 are described for an example of a case in which, when the sales page 700 is displayed on the screen, the video 600 is displayed by the picture-in-picture function.

The display 101 of FIG. 3 displays a foreground window in which the video is played on the screen so as to hide a portion of a background window in which content including user-operable interactive elements is provided.

The foreground window is a window displayed in the foreground in the screen of the terminal device 100. The background window is a window displayed behind the foreground window in the screen of the terminal device 100. Specifically, in the screen of the terminal device 100, the foreground window is a window that is displayed overlaid on the background window. Additionally, the order of the foreground window and the background window in the screen does not switch due to operations of a user. That is, even if the user performs an operation on the background window, the foreground window continues to be displayed in the foreground in the screen of the terminal device 100.

The interactive elements are user-operable elements included in the content and, for example, are a link, a button, a check box, a list box, or the like that have an on-click attribute. In one example, the interactive elements in the sales page 700 are the box 703 and the button 704.

Figure 6:
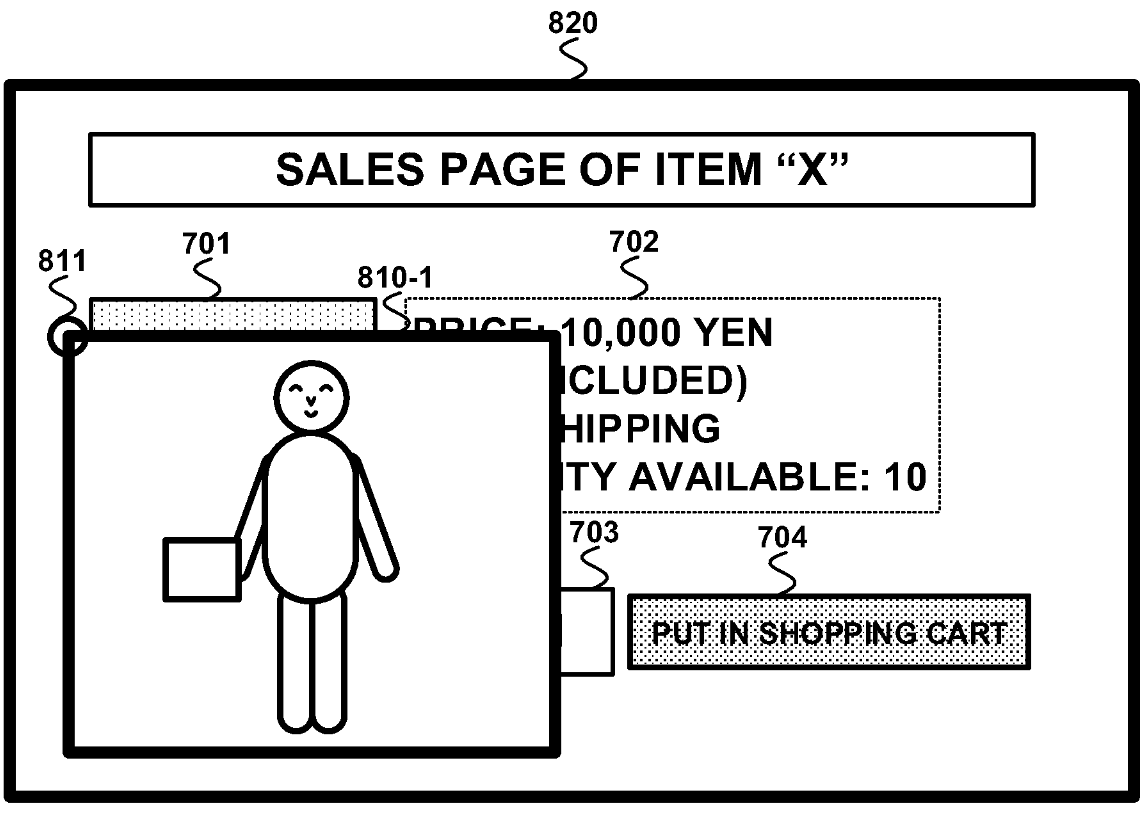
FIG. 6 is a drawing illustrating a situation in which the video according to the embodiment is displayed in a foreground window.

In one example, when a user selects the button 606 (FIG. 4) for transitioning to the sales page, as illustrated in FIG. 6, the display 101 displays a foreground window 810-1 in which a video obtained by reducing a display region of the video 600 is displayed. Here, the foreground window 810-1 is displayed so as to hide a portion of the background window 820 in which the sales page 700 is displayed. Note that it is assumed that initial values of the position and the size of the foreground window 810-1 when displaying the video by the picture-in-picture function are appropriately set by the user or an administrator of the application. Additionally, in FIG. 6, it is assumed that the background window 820 is full-screen displayed in the screen of the terminal device 100.

The detector 102 of FIG. 3 detects hiding of the interactive elements by the foreground window.

In one example, when, as in FIG. 6, the box 703 of the sales page 700 being displayed in the background window 820 is hidden by the foreground window 810-1, the detector 102 detects the hiding of the interactive element (the box 703) by the foreground window 810-1. Specifically, the detector 102 obtains a region in which the interactive element (the box 703) is drawn, and detects the hiding by determining whether the foreground window 810-1 is overlaid on the obtained region.

When hiding is detected, the changer 103 of FIG. 3 changes at least either a position or a size of the foreground window so that a portion or an entirety of a hidden portion of the interactive element is no longer hidden.

In one example, when it is possible to avoid the hiding of the interactive element by the foreground window by reducing the size of the foreground window by a predetermined ratio, the changer 103 reduces the size of the foreground window by the predetermined ratio without changing the position of the foreground window.

Here, "without changing the position of the foreground window" means not moving a reference position within the foreground window. The reference position is appropriately set by the user or the administrator of the application. In the following, the reference position is set to a position 811 (FIG. 6) of an upper left corner of the foreground window. Additionally, in the following, the predetermined ratio is set to m % (where m is a positive number).

Figure 7:
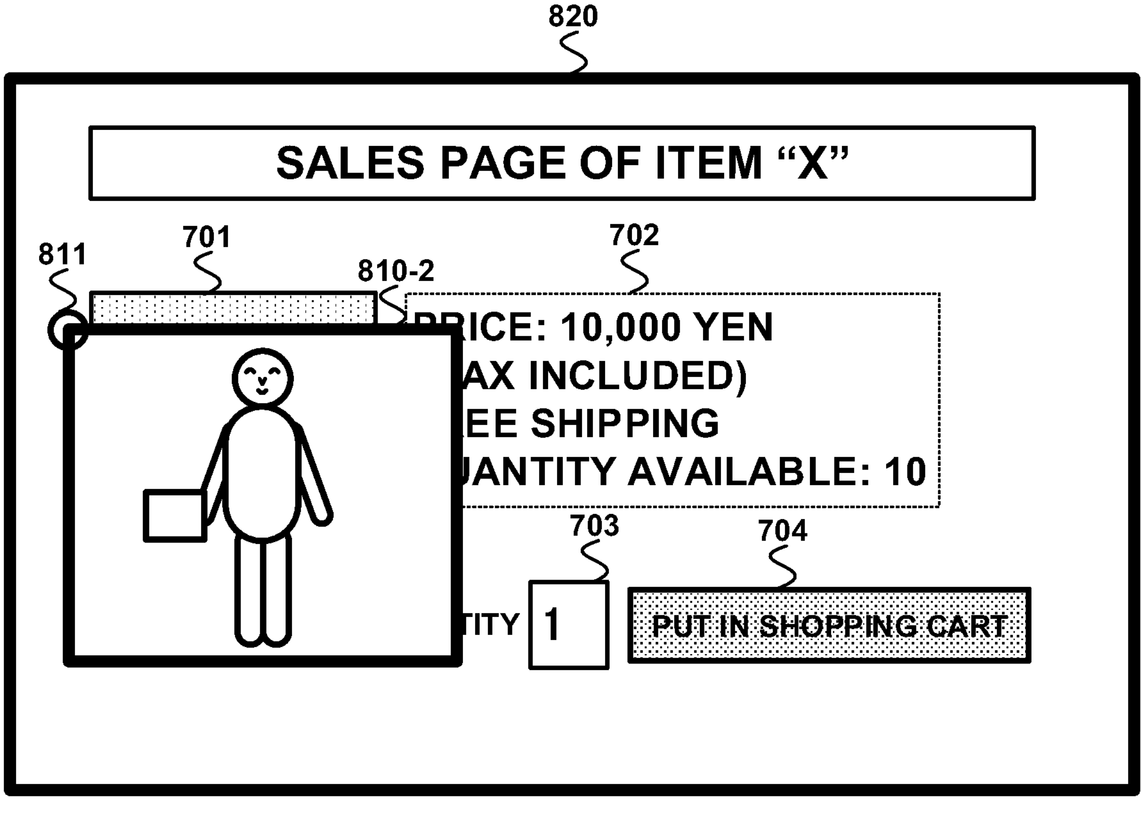
FIG. 7 is a drawing illustrating a situation in which a size of the foreground window according to the embodiment is changed.

For example, when a determination is made that the hiding of the interactive element (the box 703) can be avoided by a foreground window obtained by changing the size of the foreground window 810-1 by m %, the changer 103 changes the size to a foreground window 810-2 (FIG. 7) that is m % smaller than the foreground window 810-1, without moving the position 811. That is, the changer 103 changes the size of the foreground window 810-1 so that the entirety of the hidden portion of the interactive element is no longer hidden. As illustrated in FIG. 7, the display 101 displays the foreground window 810-2 that has the changed size.

Note that, in a case in which the reference position is set to the center of the foreground window, when a determination is made that the hiding of the interactive element (the box 703) can be avoided by a foreground window obtained by changing the size of the foreground window 810-1 by m %, the changer 103 reduces the size of the foreground window 810-1 by m %, without moving the center of the foreground window. Accordingly, the positions of the four corners (upper left, upper right, lower left, and lower right corners) of the foreground window 810-1 are changed.

Figure 8:
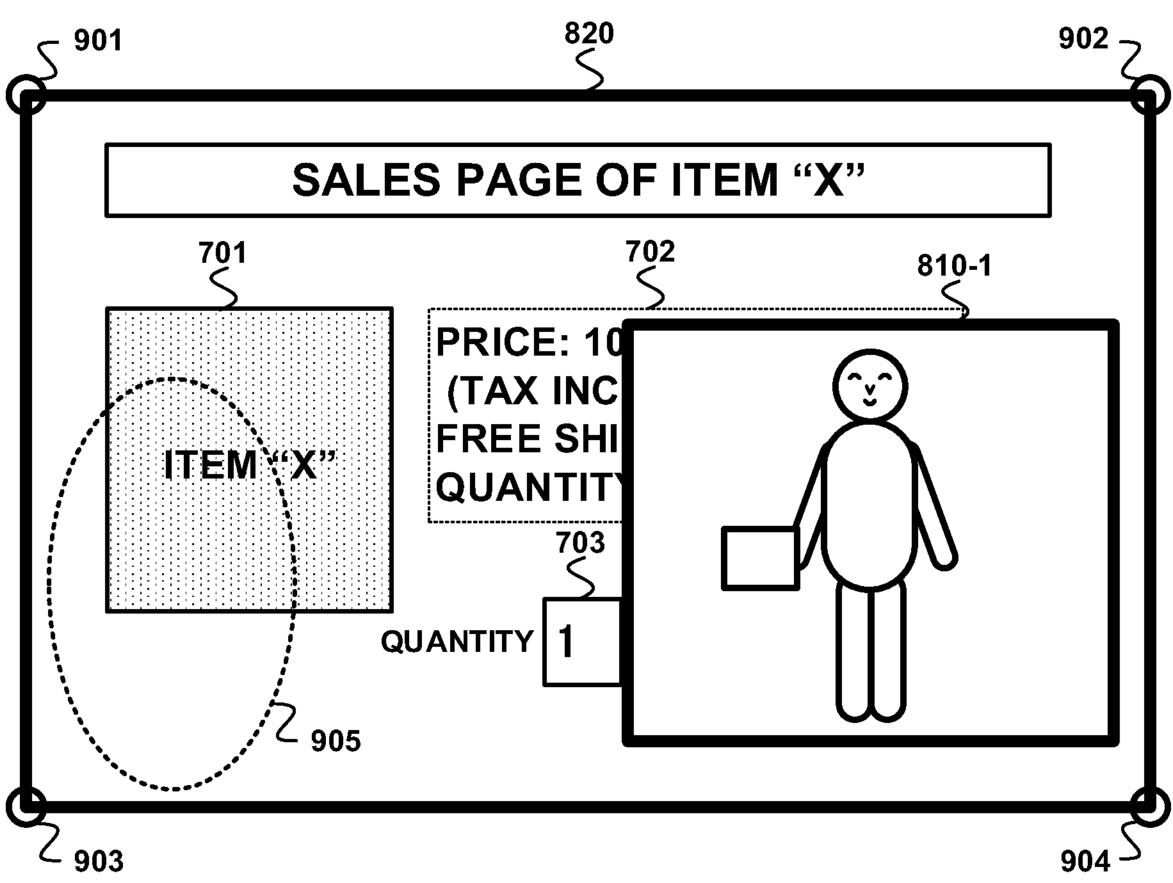
FIG. 8 is a drawing illustrating a situation in which the video according to the embodiment is displayed in the foreground window.

Meanwhile, for example, as in FIG. 8, when the button 704 of the sales page 700 being displayed in the background window 820 is hidden by the foreground window 810-1, the detector 102 detects the hiding of the interactive element (the button 704) by the foreground window 810-1.

In this case, the changer 103 determines that the hiding of the interactive element (the button 704) cannot be avoided by a foreground window obtained by reducing the size of the foreground window 810-1 by m %, and changes the position of the foreground window 810-1.

Specifically, when the hiding is detected, the changer 103 moves the position of the foreground window to a candidate position, of a plurality of predetermined candidate positions in the screen, where the foreground window does not hide the interactive element.

In the following, the plurality of predetermined candidate positions are set to positions 901 to 904 of the four corners of the screen.

Figure 9:
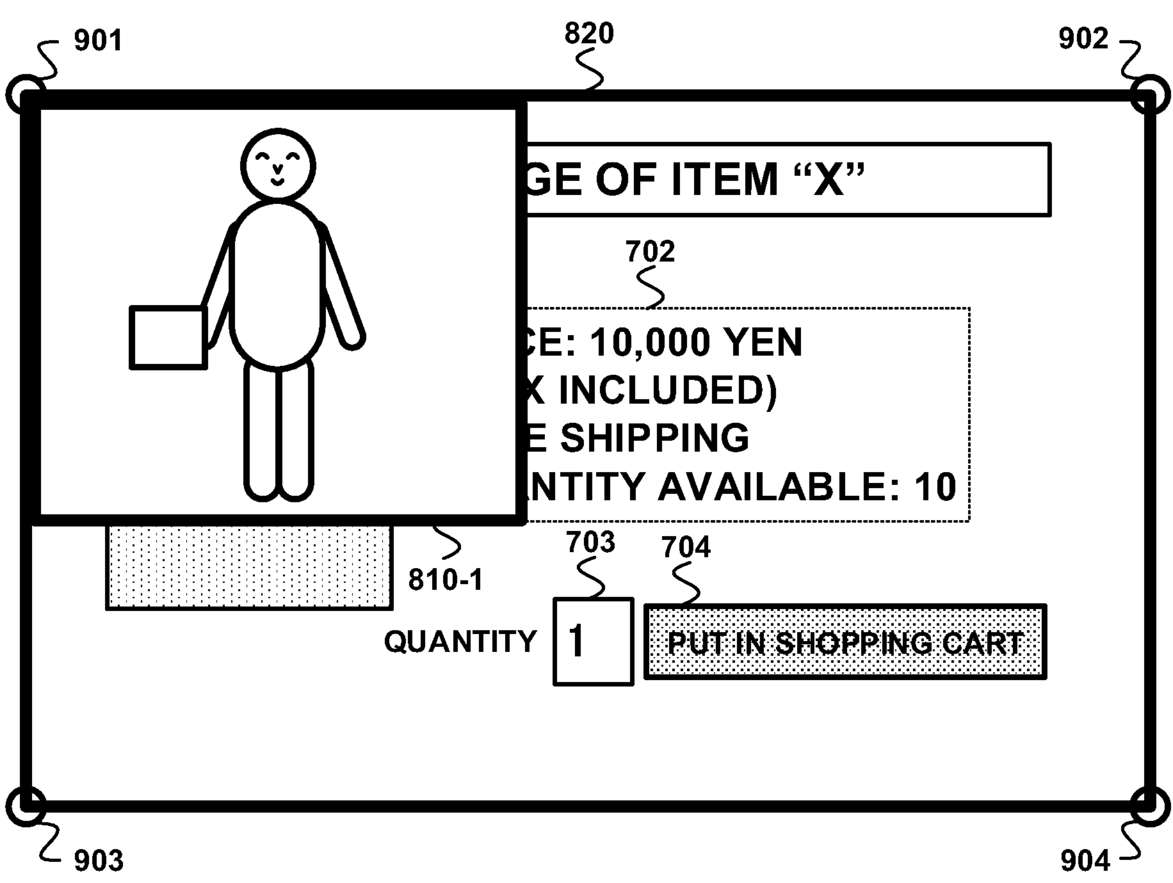
FIG. 9 is a drawing illustrating a situation in which a position of the foreground window according to the embodiment is changed.
Figure 10:
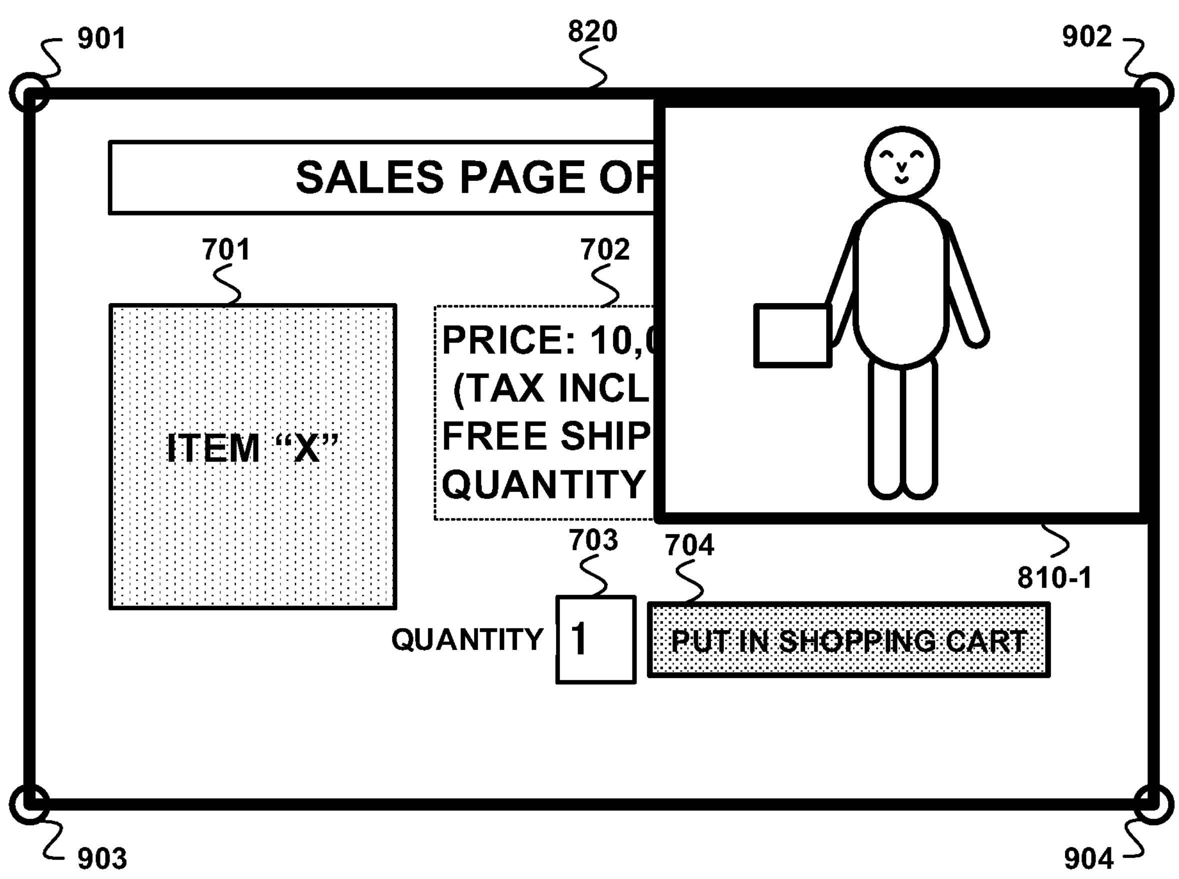
FIG. 10 is a drawing illustrating a situation in which the position of the foreground window according to the embodiment is changed.
Figure 11:
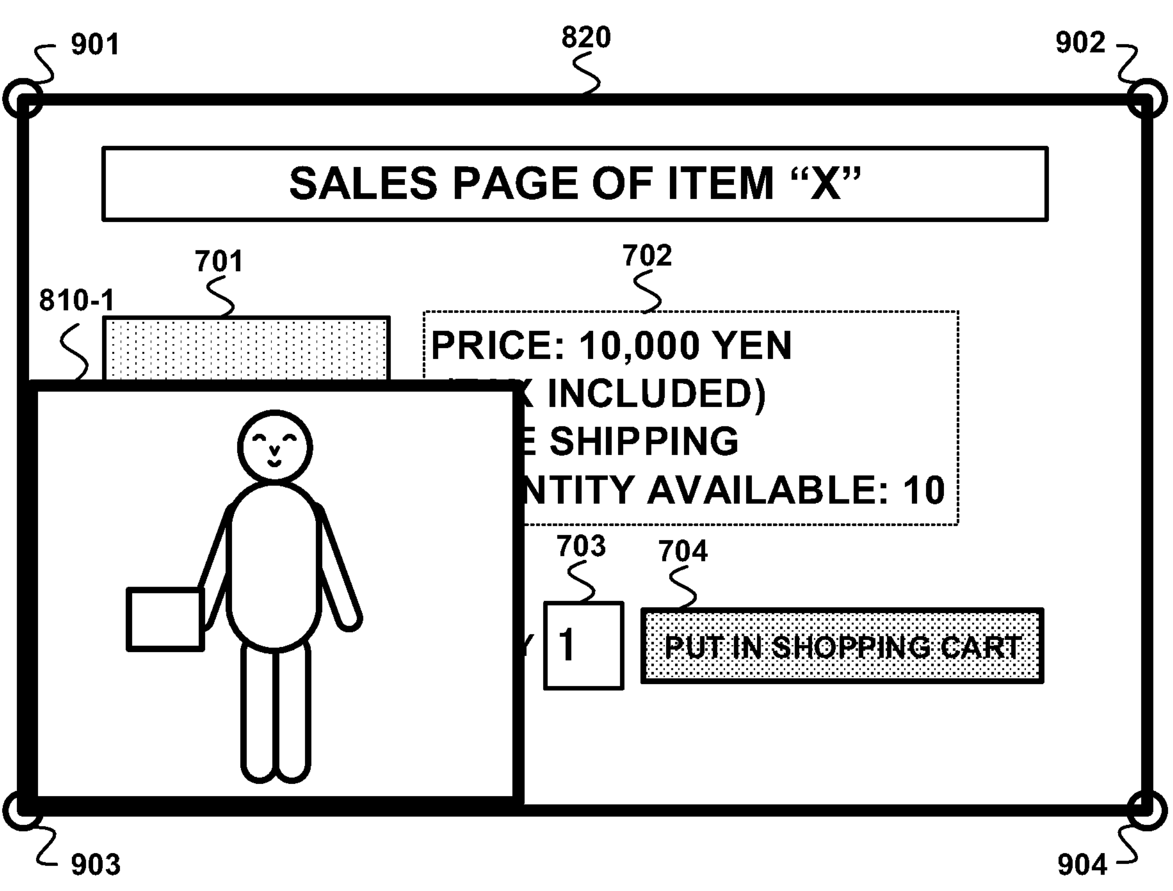
FIG. 11 is a drawing illustrating a situation in which the position of the foreground window according to the embodiment is changed.
Figure 12:
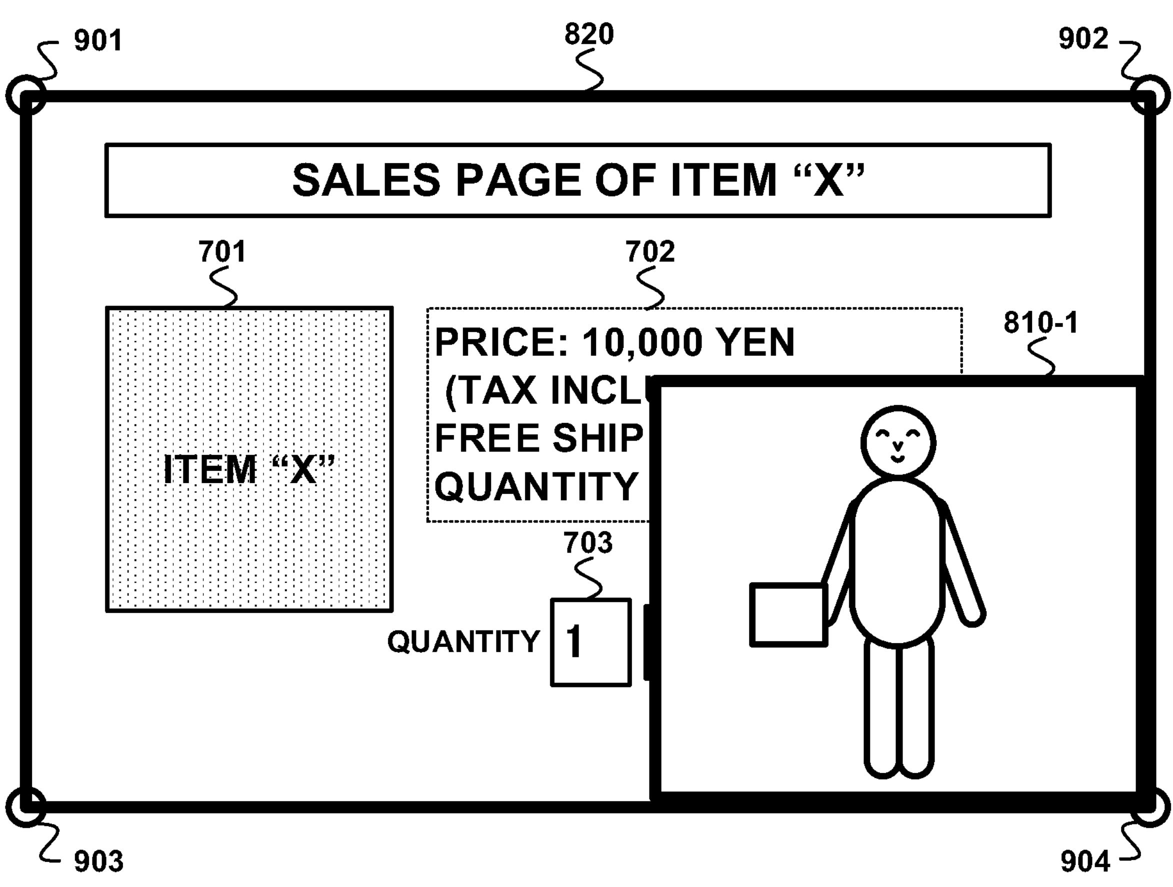
FIG. 12 is a drawing illustrating a situation in which the position of the foreground window according to the embodiment is changed.

In one example, of the positions 901 to 904, the changer 103 specifies the positions 901, 902, and 903 as the positions where the foreground window 810-1 does not hide the interactive elements (the box 703 and the button 704). Moreover, as illustrated in FIGS. 9 to 11, the changer 103 changes the position of the foreground window 810-1 so as to overlay the corner, of the four corners of the foreground window 810-1, closest to the specified position on the specified position 901, 902, or 903. Specifically, the changer 103 changes the position of the foreground window 810-1 so that the entirety of the hidden portion of the interactive element (the button 704) is no longer hidden.

Here, when there is a plurality of candidate positions where the foreground window does not hide the interactive element, the changer 103 may move the foreground window as described below.

Firstly, the receiver 104 of FIG. 3 receives a touch operation on the screen from a user.

For example, when the application is started up, the receiver 104 receives a touch operation such as a tap, a slide, a swipe, or the like that the user of the terminal device 100 performs on the screen. Then, the receiver 104 stores, in the recording medium 14 and as touch operation history information, information expressing the region in which the touch operation is performed.

Then, the changer 103 moves the position of the foreground window to a candidate position, of the plurality of candidate positions, where the foreground window does not overlap a region in which the frequency of the touch operation on the screen is high.

For example, the changer 103 references the touch operation history information stored in the recording medium 14 to identify the region in which the frequency of touch operations being performed is high. For example, when the changer 103 identifies a region 905 (FIG. 8) of the lower left of the screen as a region in which the frequency of the touch operation being performed is higher than in other regions, the changer 103 excludes the positions 901 and 903, where the region 905 and the foreground window 810-1 overlap, from the candidate positions of the movement destination. That is, as illustrated in FIG. 10, the changer 103 moves the foreground window 810-1 so as to overlay one of the four corners of the foreground window 810-1 on the position 902.

Note that, in a case in which the foreground window hides the interactive element regardless of which of the plurality of candidate positions the foreground window is moved to, the changer 103 sequentially moves the foreground window to each of the plurality of candidate positions over time.

For example, when a link is set at the information 702, the information 702 is an interactive element and, as in FIGS. 9 to 12, even if the foreground window 810-1 is moved so that one of the four corners thereof is overlaid on the positions 901 to 904, the interactive elements (the information 702 and the button 704) will be hidden. In such a case, the changer 103 sequentially moves the foreground window 810-1 so that one of the four corners is overlaid on each of the positions 901 to 904 over time. That is, the changer 103 changes the position of the foreground window 810-1 so that a portion of the hidden portion of the interactive element is no longer hidden.

Specifically, the changer 103 intermittently moves the foreground window to each of the plurality of candidate positions, or moves the foreground window among each of the plurality of candidate positions at a predetermined speed.

For example, the changer 103 moves the position of the foreground window 810-1 to the position illustrated in FIG. 9, and after a predetermined period (for example, 5 seconds) elapses, moves the position of the foreground window 810-1 to the position illustrated in FIG. 10. After the predetermined period elapses after the changer 103 moves the position of the foreground window 810-1 to the position illustrated in FIG. 10, the changer 103 moves the position of the foreground window 810-1 to the position illustrated in FIG. 11, and after the predetermined period elapses after moving to the position illustrated in FIG. 11, the changer 103 moves the position of the foreground window 810-1 to the position illustrated in FIG. 12. Such movement is repeated until a stop is commanded by the user.

Alternately, the changer 103 sequentially moves the foreground window 810-1 to the positions illustrated in FIGS. 9 to 12 at a predetermined speed n [pixel/sec] (where n is a positive number).

4. Operations of Terminal Device of the Embodiment

The operations of the terminal device 100 of the present embodiment are described using FIG. 13. In one example, display control processing of FIG. 13 is started when the display 101 of the terminal device 100 displays a video on the screen by the picture-in-picture function, and is repeated every time the display of the background window is updated. For example, the display control processing is executed when the display of the background window is updated due to a scroll operation, transitioning to another page, or the like.

The detector 102 determines whether hiding of the interactive element by the foreground window is detected (step S101). When the detector 102 determines that the hiding is detected (step S101; YES), the changer 103 determines whether it is possible to avoid the hiding of the interactive element by the foreground window by reducing the size of the foreground window by the predetermined ratio (step S102). Meanwhile, when the detector 102 determines that the hiding is not detected (step S101; NO), the detector 102 stands by as-is.

In one example, when the foreground window 810-1 as in FIG. 6 is displayed, the detector 102 detects the hiding of the interactive element (the box 703) by the foreground window 810-1. Alternatively, when the foreground window 810-1 as in FIG. 8 is displayed, the detector 102 detects the hiding of the interactive element (the button 704) by the foreground window 810-1. Meanwhile, when the box 703 and the button 704 displayed in the background window 820 are not hidden by the foreground window 810-1, the detector 102 does not detect the hiding of the interactive element.

When the changer 103 determines that it is possible to avoid the hiding of the interactive element by the foreground window by reducing the size of the foreground window by the predetermined ratio (step S102; YES), the changer 103 reduces the size of the foreground window by the predetermined ratio without changing the position of the foreground window (step S103). Meanwhile, when the changer 103 determines that it is not possible to avoid the hiding of the interactive element by the foreground window by reducing the size of the foreground window by the predetermined ratio (step S102; NO), the changer 103 determines whether, of the plurality of predetermined candidate positions in the screen, there is a candidate position where the foreground window does not hide the interactive element (step S104).

For example, when the foreground window 810-1 as in FIG. 6 is displayed, the changer 103 determines that the hiding of the interactive element (the box 703) can be avoided by a foreground window obtained by changing the size of the foreground window 810-1 by m %, and changes the size to the foreground window 810-2 (FIG. 7) that is m % smaller than the foreground window 810-1, without moving the position 811. Meanwhile, when the foreground window 810-1 as in FIG. 8 is displayed, the changer 103 determines that the hiding of the interactive element (the button 704) cannot be avoided by a foreground window obtained by changing the size of the foreground window 810-1 by m %. Then, the changer 103 determines whether a candidate position that does not hide the interactive elements (the box 703 and the button 704) will exist by moving the foreground window 810-1 so that one of the four corners of the foreground window 810-1 is overlaid on one of the positions 901 to 904.

When the changer 103 determines that, of the plurality of predetermined candidate positions in the screen, a candidate position exists where the foreground window does not hide the interactive element (step S104; YES), the changer 103 determines whether there is a plurality of candidate positions where the foreground window does not hide the interactive element (step S105). Meanwhile, when the changer 103 determines that, of the plurality of predetermined candidate positions in the screen, a candidate position does not exist where the foreground window does not hide the interactive elements (step S104; NO), step S108 is executed.

In one example, of the positions 901 to 904, the changer 103 specifies the positions 901, 902, and 903 as the positions where the foreground window 810-1 does not hide the interactive elements (the box 703 and the button 704), and determines that a plurality of candidate positions exists where the foreground window 810-1 does not hide the interactive elements. Meanwhile, when, for example, a link is set to the information 702 of FIG. 8, the changer 103 determines that the candidate position does not exist where the foreground window 810-1 does not hide the interactive elements (the information 702 and the button 704).

When the changer 103 determines that a plurality of candidate positions where the foreground window 810-1 does not hide the interactive elements exists (step S105; YES), the changer 103 specifies a candidate position, of the plurality of candidate positions, where the foreground window does not overlap the region in which the frequency of the touch operation on the screen is high (step S106). Then, the changer 103 moves the foreground window to the specified candidate position (step S107). Meanwhile, when the changer 103 determines that a plurality of candidate positions where the foreground window does not hide the interactive elements does not exist (step S105; NO), the changer 103 moves the foreground window to the candidate position where the foreground window does not hide the interactive element (step S107).

For example, when the frequency at which a touch operation is performed in the bottom left region 905 (FIG. 8) of the screen is higher compared to other regions, the changer 103 specifies the position 902 as a candidate position where the foreground window 810-1 does not overlap the region 905. Then, the changer 103 moves the foreground window 810-1 as illustrated in FIG. 10. Meanwhile, when one candidate position is specified where the foreground window 810-1 does not overlap the interactive elements included in the background window 820, the changer 103 moves the foreground window 810-1 to the specified candidate position.

When, of the plurality of candidate positions in the screen, a candidate position where the foreground window does not hide the interactive elements does not exist, that is, regardless of which of the plurality of candidate positions the foreground window is moved to, the foreground window hides the interactive element, the changer 103 sequentially moves the foreground window to each of the plurality of candidate positions over time (step S108).

For example, when a link is set to the information 702, the changer 103 intermittently moves the foreground window 810-1 to each of the positions illustrated in FIG. 9 to 12, or sequentially moves the foreground window 810-1 among the positions illustrated in FIGS. 9 to 12 at the predetermined speed n [pixel/sec].

According to the present embodiment, the position and the size of the video displayed on the screen is automatically changed and, consequently, the video can be displayed over the content while avoiding hiding of user-operable interactive elements included in the content. As a result, the user can perform operations on the operable elements with respect to the content while viewing the video.

According to the present embodiment, the foreground window is moved to a candidate position, of the plurality of predetermined candidate positions, where the foreground window does not hide the user-operable elements. As a result, suitable positions where the foreground window is less likely to be a visual obstruction can be set in advance, and the foreground window can be moved to positions that are less likely to be a visual obstruction and, also, where the foreground window does not hide the user-operable elements.

According to the present embodiment, the foreground window is moved to a candidate position that does not overlap the region in which the frequency of the touch operation on the screen by the user is high. As a result, a touch operation on the screen can be performed without being obstructed by the foreground window in which the video is played.

According to the present embodiment, in a case in which the foreground window hides the interactive element regardless of which of the plurality of candidate positions the foreground window is moved to, the foreground window is sequentially moved to each of the plurality of candidate positions over time. As a result, the portion of the interactive element that is hidden can be changed, and the user can recognize the outline of the interactive element even when hidden.

According to the present embodiment, the foreground window is intermittently moved to each of the plurality of candidate positions, or is moved among each of the plurality of candidate positions at the predetermined speed. As a result, the portion of the interactive element that is hidden changes at a set timing or gradually, thereby making it easier to recognize the outline of the interactive element.

According to the present embodiment, when it is possible to avoid the hiding of the interactive element by reducing the size of the foreground window by the predetermined ratio, the size of the foreground window is reduced by the predetermined ratio without changing the position of the foreground window. As a result, the user can perform operations on the interactive element while viewing the video at the same position of the screen.

5. Modified Examples

An embodiment of the present disclosure is described above. However, various modifications and applications are possible when implementing the present disclosure.

In the embodiment described above, an example of implementation in an application is described, but implementation in two windows of a browser is also possible.

For example, the display 101 acquires the position and the size of the foreground window (one window of the browser) in which the video 600 is played, and intermittently sends the acquired position and size to the video provision server 200. When, for example, the background window (other window of the browser) in which content is provided is displayed on the screen, the detector 102 queries the video provision server 200 for the position and the size of the foreground window to acquire the position and the size of the foreground window. Additionally, the detector 102 acquires the position and the size of the background window, and compares the acquired position and the size with the position and the size of the foreground window to identify which region of the background window is hidden. The detector 102 detects the hiding by determining, on the basis of the position and the size of the interactive element, whether the region of the background window hidden by the foreground window overlaps the region of the interactive element.

In the embodiment described above, the terminal device 100 detects the hiding of the interactive element by the foreground window, but the present disclosure is not limited thereto, and a configuration is possible in which a server device capable of communicating with the terminal device 100 detects the hiding and causes the terminal device 100 to change the position or the size of the foreground window.

Specifically, the server device acquires, from the terminal device 100, the positions and the sizes of the foreground window in which the video is played and the background window in which content including the interactive element is provided, which are displayed on the screen of the terminal device 100, and the position and the size of the interactive element. Next, the server device detects, on the basis of the acquired positions and sizes, the hiding of the interactive element by the foreground window. When the hiding is detected, the server device causes the terminal device 100 to change at least either the position or the size of foreground window so that a portion or an entirety of the hidden portion of the interactive element is no longer hidden.

In one example, when the foreground window 810-1 and the background window 820 as in FIG. 6 are displayed, the server device acquires, from the terminal device 100, the positions and the sizes of the foreground window 810-1 and the background window 820, and the positions and the sizes of the interactive elements (the box 703 and the button 704). The server device compares the position and the size of the foreground window 810-1 with the position and the size of the background window 820 to identify which region of the background window 820 is hidden. Next, the server device detects the hiding by determining, on the basis of the positions and the sizes of the interactive elements, whether the region of the background window 820 hidden by the foreground window 810-1 overlaps the regions of an interactive element. When the hiding is detected, the server device sends, to the terminal device 100, a command specifying at least either the position or the size of the foreground window 810-1 at which a portion or the entirety of the hidden portion of the interactive element is no longer hidden.

In the embodiment described above, an example is described in which, when the hiding is detected, one of the position and the size of the foreground window is changed, but a configuration is possible in which both the position and the size are changed. For example, when the foreground window hides an interactive element regardless of which of the plurality of candidate positions the foreground window is moved to, the size of the foreground window 810-1 may be reduced by the predetermined ratio and, also, may be sequentially moved to each of the plurality of candidate positions over time.

In the embodiment described above, the display control processing for when the hiding is detected is illustrated in the flowchart of FIG. 13, but the display control processing executed by the terminal device 100 is not limited thereto. In one example, when the detector 102 detects the hiding of an interactive element by the foreground window, the changer 103 changes at least either the position or the size of the foreground window so that a portion of the hidden portion of the interactive element is no longer hidden. Then, when the detector 102 detects the hiding of the interactive element by the changed foreground window for which at least either the position or the size is changed, the changer 103 further changes at least either the position or the size of the changed foreground window so that a portion of the hidden portion of the interactive element is no longer hidden. Thus, the changer 103 repeats the changing of the position and the size until the hiding is no longer detected by the detector 102.

In one example, when the detector 102 detects the hiding of an interactive element by the foreground window, the changer 103 reduces the size of the foreground window by the predetermined ratio. Then, when the detector 102 detects the hiding of the interactive element by the changed foreground window for which the size has been reduced by the predetermined ratio, the changer 103 changes the position of the changed foreground window so that a portion of the portion of the interactive element hidden by the changed foreground window is no longer hidden. This processing is repeated until the hiding is no longer detected.

In the embodiment described above, when the terminal device 100 includes two or more processors, these processors may carry out, in a distributed manner, the processes executed by display 101, the detector 102, the changer 103, and the receiver 104.

A program defining the operations of the terminal device 100 according to the embodiment described above can be applied to an existing personal computer or information terminal device to cause that personal computer or information terminal device to function as the terminal device 100 according to the embodiment.

This program may be stored on a non-transitory recording medium. The non-transitory recording medium can be distributed and sold independent from the computer. Here, the term "non-transitory recording medium" refers to a tangible recording medium. Examples of the non-transitory recording medium include compact disks, flexible disks, hard disks, optical magnetic disks, digital video disks, magnetic tape, and semiconductor memory. The term "transitory recording medium" means the transmission medium (the propagation signal) itself. Examples of transitory recording media include electronic signals, optical signals, and electromagnetic waves. Note that the term "temporary storage space" refers to space for temporarily storing data and a program. Examples of the temporary storage space include volatile memory such as RAM.

APPENDICES

[1] A terminal device comprising:

one or more processors, wherein the processors execute processing for displaying a foreground window in which a video is played on a screen so as to hide a portion of a background window in which content including a user-operable interactive element is provided, detecting hiding of the interactive element by the foreground window, and when the hiding is detected, changing at least either a position or a size of the foreground window so that a portion or an entirety of a hidden portion of the interactive element is no longer hidden.

[2] The terminal device according to [1], wherein the processors execute processing for when the hiding is detected, moving the position of the foreground window to a candidate position, of a plurality of predetermined candidate positions in the screen, where the foreground window does not hide the interactive element.

[3] The terminal device according to [2], wherein the processors execute processing for receiving a touch operation on the screen from a user, and where there is a plurality of candidate positions where the foreground window does not hide the interactive element, moving the position of the foreground window to a candidate position, of the plurality of candidate positions, where the foreground window does not overlap a region in which a frequency of the touch operation on the screen is high.

[4] The terminal device according to [2] or [3], wherein the processors execute processing for where the foreground window hides the interactive element regardless of which of the plurality of candidate positions the foreground window is moved to, sequentially moving the foreground window to each of the plurality of candidate positions over time.

[5] The terminal device according to [4], wherein the processors execute processing for intermittently moving the foreground window to each of the plurality of candidate positions, or moving the foreground window among each of the plurality of candidate positions at a predetermined speed.

[6] The terminal device according to any one of [1] to [5], wherein the processors execute processing for where it is possible to avoid the hiding of the interactive element by the foreground window by reducing the size of the foreground window by a predetermined ratio, reducing the size of the foreground window by the predetermined ratio without changing the position of the foreground window.

[7] A server device comprising:

one or more processors, wherein the processors execute processing for acquiring, from a terminal device, positions and sizes of a foreground window in which a video is played and a background window in which content including a user-operable interactive element is provided, the foreground window and the background window being displayed on a screen of the terminal device, and a position and a size of the interactive element, detecting, based on the acquired positions and sizes, hiding of the interactive element by the foreground window, and when the hiding is detected, causing the terminal device to change at least either the position or the size of the foreground window so that a portion or an entirety of a hidden portion of the interactive element is no longer hidden.

[8] A non-transitory computer-readable medium storing a program for causing a computer to execute processing for:

displaying a foreground window in which a video is played on a screen so as to hide a portion of a background window in which content including a user-operable interactive element is provided;

detecting hiding of the interactive element by the foreground window; and when the hiding is detected, changing at least either a position or a size of the foreground window so that a portion or an entirety of a hidden portion of the interactive element is no longer hidden.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be suitably used in video displaying in which a video can be displayed over content while avoiding hiding of a user-operable element included in the content.

REFERENCE SIGNS LIST

11 CPU
12 ROM
13 RAM
14 Recording medium
15 Output device
16 Communication device
17 Input device
18 Bus
100 Terminal device
101 Display
102 Detector
103 Changer
104 Receiver
200 Video provision server
300 Content provision server
400 Computer communication network
500 Information processing device
600 Video
601 Streamer
602 Item "X"
603 Panel
604, 701 Image
605, 702 Information
606, 704 Button
607 Input field
608 Rating icon
609 Display field
700 Sales page
703 Box
810-1, 810-2 Foreground window
820 Background window
811, 901 to 904 Position
905 Region

The invention claimed is:

1. A terminal device, comprising:

memory configured to store one or more instructions;

one or more processors, wherein the one or more instructions, when executed by the one or more processors, cause the terminal device to:

display a foreground window in which a video is played on a screen, wherein the display of the foreground window hides a portion of a background window in which content including a user-operable interactive element is provided;

detect hiding of the interactive element by the foreground window; and based on the hiding of the interactive element by the foreground window being detected, change at least either a position or a size of the foreground window so that a portion or an entirety of a hidden portion of the interactive element is no longer hidden; and when the foreground window would hide a portion of the hidden portion of the interactive element in each of a plurality of candidate positions, sequentially change the position of the foreground window among the plurality of candidate positions by intermittently changing the position of the foreground window to each of the plurality of candidate positions or changing the position of the foreground window among the plurality of candidate positions at a predetermined speed.

2. The terminal device according to claim 1, wherein the one or more instructions, when executed by one or more processors, cause the terminal device to:

based on the hiding of the interactive element by the foreground window being detected, change the position of the foreground window to a candidate position of a plurality of candidate positions, wherein the foreground window does not hide the interactive element in the candidate position.

3. The terminal device according to claim 2, wherein the candidate position is a position in which the foreground window does not overlap a region in which a frequency of a touch operation of a user on the screen is high.

4. The terminal device according to claim 1, wherein the one or more instructions, when executed by the one or more processors, cause the terminal device to:

determine whether it is possible to avoid the hiding of the interactive element by the foreground window by reducing the size of the foreground window by the predetermined ratio; and based on determining that it is possible to avoid the hiding of the interactive element by the foreground window by reducing the size of the foreground window by the predetermined ratio, reduce the size of the foreground window by the predetermined ratio without changing the position of the foreground window.

5. The terminal device according to claim 1, wherein the one or more instructions, when executed by the one or more processors, cause the terminal device to:

determine, based on a region of the interactive element in which the interactive element is drawn, a set of candidate positions that avoid hiding the region of the interactive element, wherein the position of the foreground window is automatically changed to a candidate position of the set of candidate positions.

6. The terminal device according to claim 5, wherein the set of candidate positions are determined based on:

comparing a position and a size of the region in which the interactive element is drawn to a size of the foreground window and one or more potential positions of the foreground window; and determining, for each potential position of the one or more potential positions of the foreground window, whether the foreground window would overlap with the region in which the interactive element is drawn.

7. The terminal device according to claim 1, wherein the hiding of the interactive element by the foreground window is detected based on comparing a position and a size of a region in which the interactive element is drawn to a position and a size the foreground window.

8. A server device comprising:

memory storing one or more instructions;

one or more processors, wherein the one or more instructions, when executed by the one or more processors, cause the server device to:

acquire, from a terminal device, a position and a size of a foreground window in which a video is played;

acquire, from the terminal device, a position and a size of a background window in which content including a user-operable interactive element is provided, wherein the foreground window and the background window are displayed on a screen of the terminal device, and;

acquire, from the terminal device, a position and a size of the interactive element;

detect hiding of the interactive element by the foreground window based on the position and the size of the foreground window, the position and the size of the background window, and the position and the size of the interactive element, and;

based on the hiding of the interactive element by the foreground window being detected, cause the terminal device to change at least either the position or the size of the foreground window so that a portion or an entirety of a hidden portion of the interactive element is no longer hidden; and when the foreground window would hide a portion of the hidden portion of the interactive element in each of a plurality of candidate positions, sequentially change the position of the foreground window among the plurality of candidate positions by intermittently changing the position of the foreground window to each of the plurality of candidate positions or changing the position of the foreground window among the plurality of candidate positions at a predetermined speed.

9. A non-transitory computer-readable medium having stored therein a program, which when executed by one or more processors, cause an electronic device to:

display a foreground window in which a video is played on a screen, wherein the display of the foreground window hides a portion of a background window in which content including a user-operable interactive element is provided;

detect hiding of the interactive element by the foreground window; and based on the hiding of the interactive element by the foreground window being detected, change at least either a position or a size of the foreground window so that a portion or an entirety of a hidden portion of the interactive element is no longer hidden; and when the foreground window would hide a portion of the hidden portion of the interactive element in each of a plurality of candidate positions, sequentially change the position of the foreground window among the plurality of candidate positions by intermittently changing the position of the foreground window to each of the plurality of candidate positions or changing the position of the foreground window among the plurality of candidate positions at a predetermined speed.

* * * * *